(12) United States Patent
Morris

(10) Patent No.: US 8,244,456 B2
(45) Date of Patent: Aug. 14, 2012

(54) VALIDATION OF TRACK DATABASES

(75) Inventor: Charles W. Morris, Manassas, VA (US)

(73) Assignee: Lockheed Martin Corporation, Bethesda, MD (US)

(*) Notice: Subject to any disclaimer, the term of this patent is extended or adjusted under 35 U.S.C. 154(b) by 490 days.

(21) Appl. No.: 12/402,681

(22) Filed: Mar. 12, 2009

(65) Prior Publication Data
US 2010/0235404 A1 Sep. 16, 2010

(51) Int. Cl.
*G06F 17/10* (2006.01)
(52) U.S. Cl. ........... 701/300; 701/21; 701/25; 701/469; 246/122 R; 246/126; 340/5.53; 340/5.83; 382/118; 715/764
(58) Field of Classification Search ............ 340/903, 340/5.53, 5.83; 246/122 R, 126; 382/118; 701/21, 707, 469, 25, 300; 715/764
See application file for complete search history.

(56) References Cited

U.S. PATENT DOCUMENTS

| | | | |
|---|---|---|---|
| 5,893,043 A | 4/1999 | Moehlenbrink et al. | |
| 6,029,173 A | 2/2000 | Meek et al. | |
| 6,218,961 B1 * | 4/2001 | Gross et al. | 340/903 |
| 6,434,452 B1 | 8/2002 | Gray | |
| 6,641,090 B2 | 11/2003 | Meyer | |
| 6,728,708 B1 | 4/2004 | Yotka et al. | |
| 6,993,152 B2 * | 1/2006 | Patterson et al. | 382/100 |
| 7,084,882 B1 | 8/2006 | Dorum et al. | |
| 7,142,656 B2 * | 11/2006 | Moody et al. | 379/207.16 |
| 7,142,982 B2 | 11/2006 | Hickenlooper et al. | |
| 7,564,994 B1 * | 7/2009 | Steinberg et al. | 382/118 |
| 7,667,642 B1 | 2/2010 | Frericks et al. | |
| 2002/0072833 A1 | 6/2002 | Gray | |
| 2002/0109049 A1 | 8/2002 | Alacoque et al. | |
| 2003/0033050 A1 | 2/2003 | Yutkowitz | |
| 2003/0204385 A1 | 10/2003 | Klauder, Jr. | |
| 2005/0149255 A1 | 7/2005 | Vogel et al. | |
| 2005/0152505 A1 | 7/2005 | Sokolov | |
| 2005/0228620 A1 | 10/2005 | Convert et al. | |

(Continued)

FOREIGN PATENT DOCUMENTS
EP 0795454 A1 9/1997

OTHER PUBLICATIONS

Kumar, Abhimanyu, "AU Application No. 2010200765 Office Action Feb. 21, 2011",, Publisher: IPA, Published in: AU.

(Continued)

*Primary Examiner* — James Trammell
*Assistant Examiner* — McDieunel Marc
(74) *Attorney, Agent, or Firm* — DeMont & Breyer, LLC

(57) ABSTRACT

Methods for validating track databases based on the contents of a geological database. The track database stores a piecewise-polynomial spline as a geometric representation of the track, along with offsets from spline points to represent the geo-locations of features on the track. After the computations associated with the geometric representation are completed and the track database is populated, the geo-locations of features in the track database are checked for consistency with the geo-locations of monuments in the geological database. If the geo-location of a feature in the track database is found to differ by more than a threshold distance from its projected geo-location, as computed from offsets from a monument in the geological database, then corrective action is taken. The illustrative embodiment also enables the validation of data values in the track database and relationships among track features.

16 Claims, 10 Drawing Sheets

U.S. PATENT DOCUMENTS

2006/0271291 A1   11/2006  Meyer
2010/0094551 A1*  4/2010  Bonanni ........................ 701/213
2010/0168942 A1*  7/2010  Noffsinger et al. ............. 701/21

OTHER PUBLICATIONS

Stopford, Ross H., "AU Application No. 2010200767 Office Action Oct. 15, 2010", , Publisher: IPA, Published in: AU.

Fleurantin, Jean B., "U.S. Appl. No. 12/402,695 Office Action May 25, 2011", , Publisher: USPTO, Published in: US.

Kumar, Abhimanyu, "AU Application No. 2010200766 Office Action Feb. 21, 2011", , Publisher: IPA, Published in: AU.

Stopford, Ross H., "AU Application No. 2010200767 Office Action Dec. 14, 2011", , Publisher: IPA, Published in: AU.

Badii, Behrang, "U.S. Appl. No. 12/402,706 Office Action Dec. 8, 2011", , Publisher: USPTO, Published in: US.

Weston et al., "Condition Monitoring of Railway Track Using In-Service Trains", Nov. 29-30, 2006, pp. 26-31, Publisher: IEEE.

Fleurantin, Jean B., "U.S. Appl. No. 12/402,695 Notice of Allowance Oct. 27, 2011", , Publisher: USPTO, Published in: US.

Badii, Behrang, "U.S. Appl. No. 12/402,706 Office Action Jan. 27, 2012", , Publisher: USPTO, Published in: US.

Stopford, Ross, "AU Application No. 2010200767 Office Action Oct. 6, 2011", Publisher: IPA, Published in: AU.

* cited by examiner

Figure 5

TABLE 401

| 501 X | 502 Y | 503 Z | 504 HEADING | 505 GRADE | 506 CURVATURE | 507 OFFSET |
|---|---|---|---|---|---|---|
| | | | | | | |

Figure 6

TABLE 403-*i*

| 611-*i* PROPERTY1 | 612-*i* PROPERTY2 | 613-*i* PROPERTY3 |
|---|---|---|
| | | |

TABLE 402-*i*

| 601-*i* FEATURE ID | 602-*i* TRACK POINT | 603-*i* OFFSET |
|---|---|---|
| | | |

VALIDATION OF TRACK DATABASES

CROSS-REFERENCE TO RELATED APPLICATIONS

This application is related to U.S. patent application Ser. No. 12/402,695 entitled "Updating Track Databases After Track Maintenance" and U.S. patent application Ser. No. 12/402,706 entitled "Database For Efficient Storage of Track Geometry and Feature Locations", both of which were filed on the same day as the present application.

FIELD OF THE INVENTION

The present invention relates to databases in general, and, more particularly, to the validation of databases that store railroad track geometry and feature location information.

BACKGROUND OF THE INVENTION

In many instances it might be desirable to have a database that captures the geometry of a train track, as well as the geo-locations of various features (e.g., grade crossings, mileposts, signals, platforms, switches, spurs, etc.) along the train track. For example, such a database might be useful in train motion and path-taken navigation algorithms, predictive braking algorithms, and locomotive fuel management algorithms.

SUMMARY OF THE INVENTION

In many domains, the usefulness of a database depends on the correctness of its data. Naturally, in the case of a track database—where huge monetary costs and even human lives might be at stake—validating the contents of the database and ensuring the correctness of data is absolutely critical.

The present invention provides techniques for validating track databases based on the contents of a geological database. In the illustrative embodiment, a United States Geological Survey (USGS) database comprising the locations of survey monuments is employed as the geological database. A survey monument is an object that is placed to mark key survey points on the earth's surface in geodetic and land surveys. Survey monuments are usually durable and intended to be permanent, and might be as simple as a chisel mark or nail, or might be cast and stamped metal disks set in rock or concrete pillars.

In accordance with the illustrative embodiment, the track database stores a piecewise-polynomial spline as a geometric representation of the track, along with offsets from spline points to represent the geo-locations of features on the track. After the computations associated with the geometric representation are completed and the track database is populated, the geo-locations of features in the track database are checked for consistency with the geo-locations of monuments in the geological database. If the geo-location of a feature in the track database is found to differ by more than a threshold distance from its projected geo-location, as computed from offsets (e.g., distance, heading, etc.) from a monument in the geological database, then corrective action is taken. Such corrective action might include adjusting a feature offset in the track database, adjusting data in the geometric representation of the track (e.g., track points, spline coefficients, etc.), or both.

The illustrative embodiment also provides techniques for ensuring that data values in the track database and relationships among track features in the database are valid. For example, validation of the track database might include ensuring that minimum and maximum distance constraints for a traffic signal and an associated switch are enforced, or that the enter and exit directions of two switches are the same.

The illustrative embodiment comprises: determining the geo-location of a feature on a train track from a geometric representation of the train track and an offset from a point on the train track; estimating the geo-location of a monument based on the geo-location of the feature; and when the estimated geo-location of the monument differs by at least a threshold distance from the geo-location of the monument in a geological database, adjusting at least one of the geometric representation and the offset so that a re-computed estimate of the geo-location of the monument is within the threshold distance.

BRIEF DESCRIPTION OF THE DRAWINGS

FIG. 5 depicts the structure of table 401, as shown in FIG. 4, in accordance with the illustrative embodiment of the present invention.

FIG. 6 depicts the structure of table 402-$i$, where i is an integer between 1 and N, in accordance with the illustrative embodiment of the present invention.

DETAILED DESCRIPTION

Figure 1:
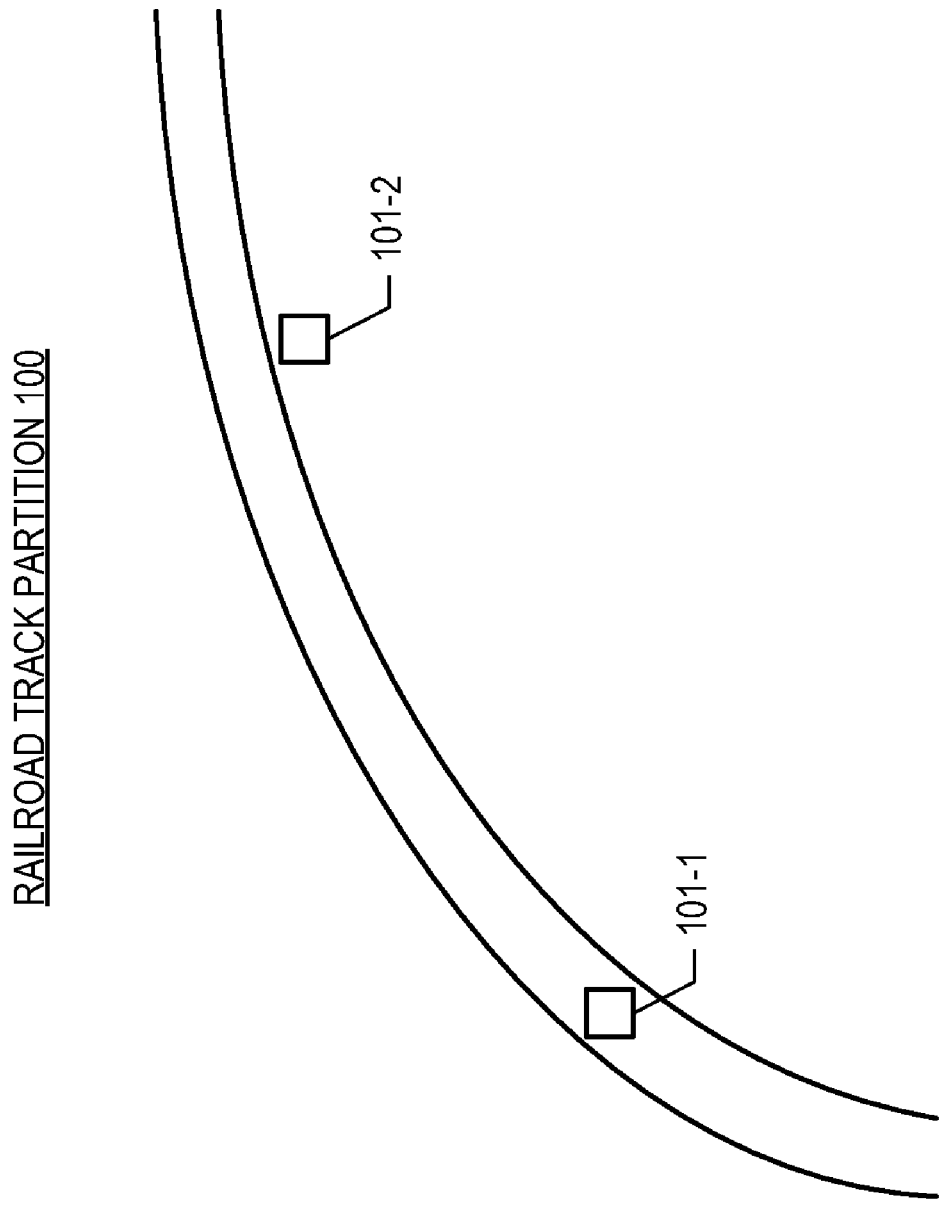
FIG. 1 depicts a segment of illustrative railroad track partition 100 and illustrative features 101-1 and 101-2, in accordance with the illustrative embodiment of the present invention.

FIG. 1 depicts a segment of illustrative railroad track partition 100 and illustrative features 101-1 and 101-2, in accordance with the illustrative embodiment of the present invention. As shown in FIG. 1, a feature might be located either on or abreast railroad track partition 100, depending on the particular type of feature. For example, feature 101-1, which is located on railroad track partition 100, might be a switch, while feature 101-2, which is abreast railroad track partition 100, might be a platform.

Figure 2:
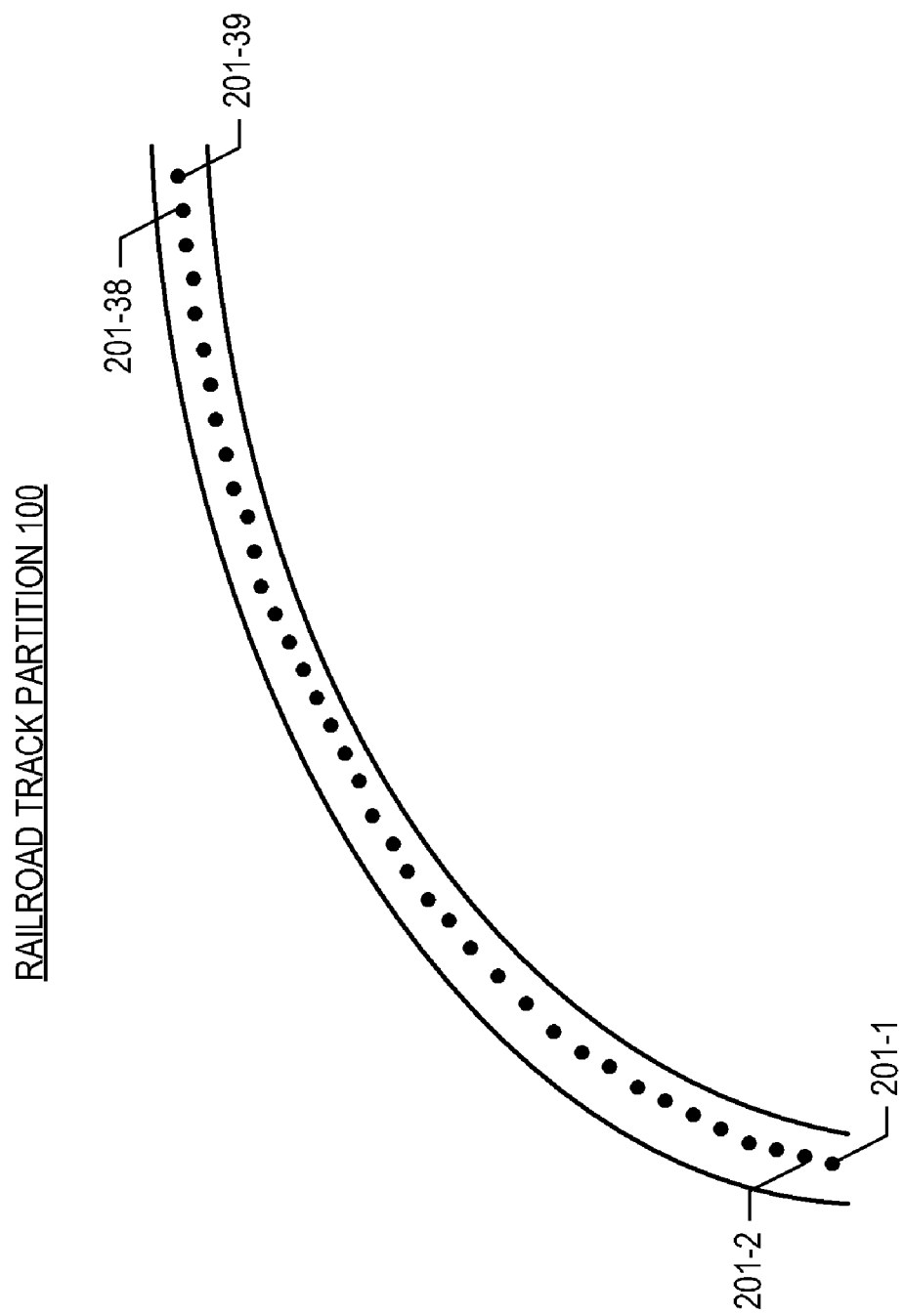
FIG. 2 depicts railroad track partition 100 and illustrative centerline geo-locations 201-1 through 201-39 that are obtained from a survey, in accordance with the illustrative embodiment of the present invention.

FIG. 2 depicts railroad track partition 100 and illustrative centerline geo-locations 201-1 through 201-39 that are obtained from a survey, in accordance with the illustrative embodiment of the present invention. As will be appreciated by those skilled in the art, the fact that there happen to be 39 centerline geo-locations depicted in FIG. 2 is merely illustrative, and does not represent the actual number or spacing of centerline geo-locations obtained in a track survey.

In accordance with the illustrative embodiment, centerline geo-locations 201-1 through 201-39 are expressed in latitude/longitude/altitude, and might be obtained from readings of a Global Positioning System (GPS) unit traveling along railroad track partition 100, from an aerial survey, etc.

Construction of the Database

A key feature of the present invention is the construction of a database of relatively small size that accurately captures track geometry, as opposed to a database that stores all of the track centerline geo-locations, which would require a significantly larger amount of memory.

Figure 3:
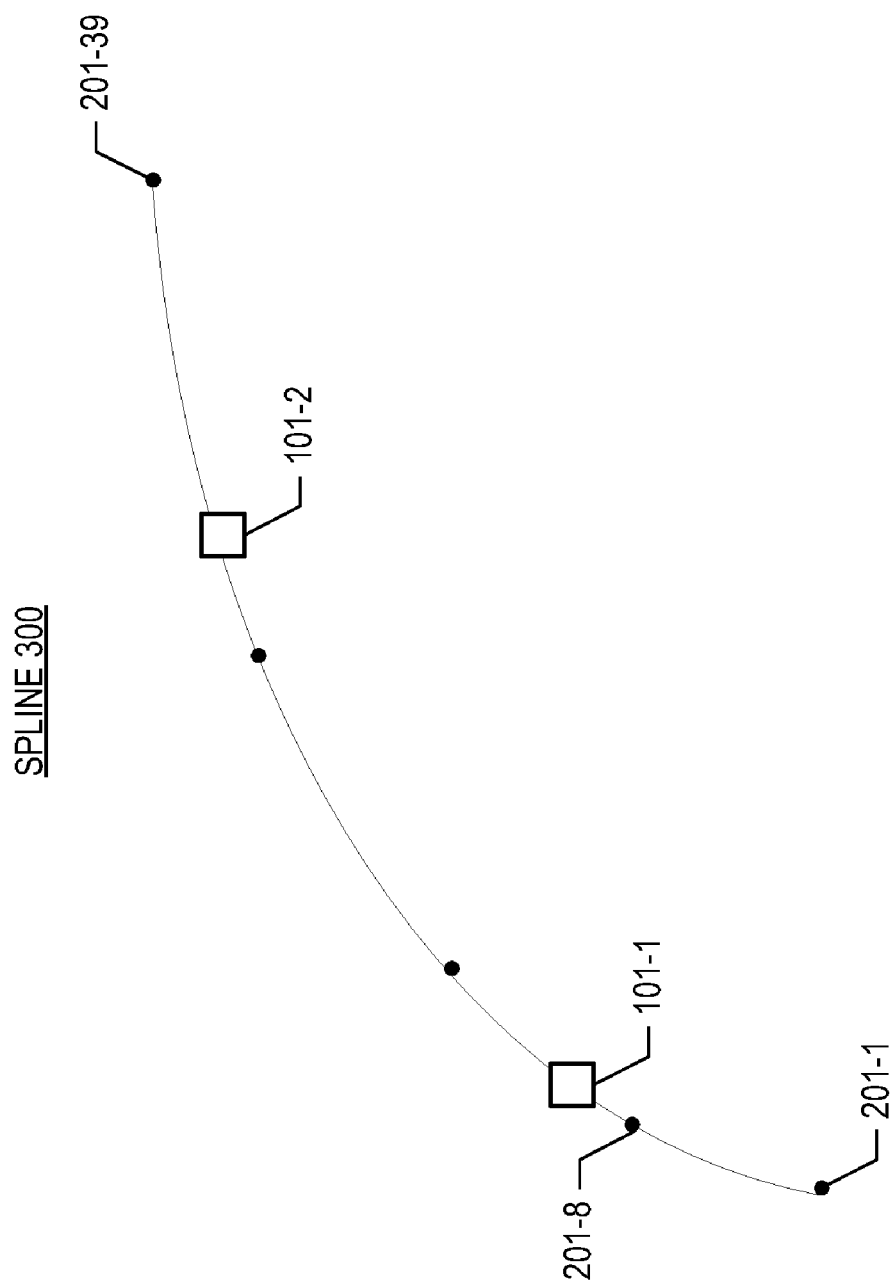
FIG. 3 depicts illustrative piecewise polynomial spline 300 that is fit to a subset of centerline geo-locations 201-1 through 201-39, in accordance with the illustrative embodiment of the present invention.

FIG. 3 depicts illustrative piecewise polynomial spline 300 that is fit to a subset of centerline geo-locations 201-1 through 201-39, in accordance with the illustrative embodiment of the present invention. As shown in FIG. 3, each point of piecewise polynomial spline 300 corresponds to a particular centerline geo-location in this subset (e.g., centerline geo-location 201-1, centerline geo-location 201-39, etc.). The manner in which piecewise polynomial spline 300 is represented and constructed is described in detail below and with respect to FIGS. 7 and 8.

Figure 4:
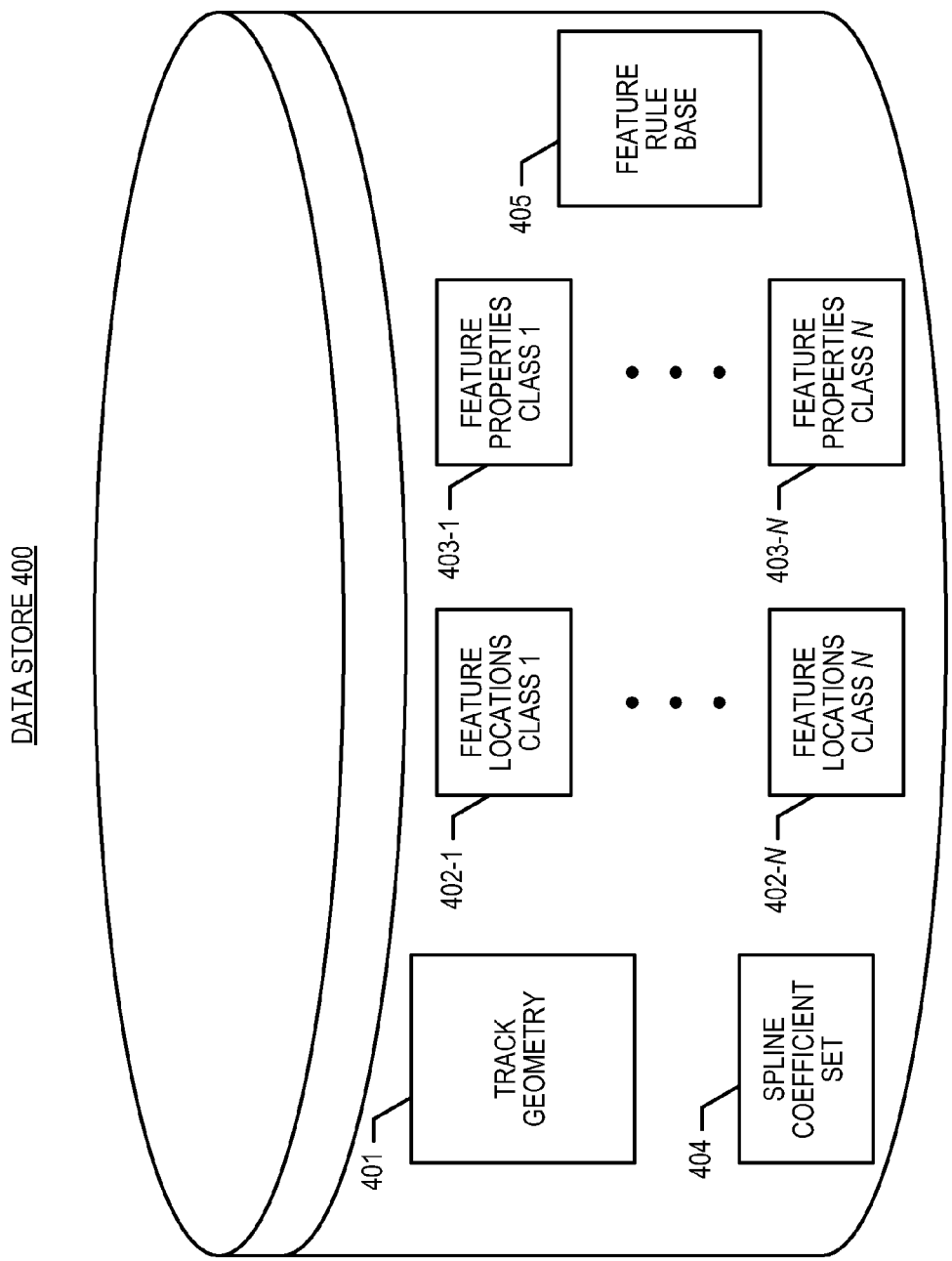
FIG. 4 depicts data store 400 for storing track geometry data and feature locations, in accordance with the illustrative embodiment of the present invention.

FIG. 4 depicts data store 400 for storing track geometry data and feature locations, in accordance with the illustrative embodiment of the present invention. In accordance with the illustrative embodiment, data store 400 is a relational database; as will be appreciated by those skilled in the art, however, some other embodiments of the present invention might employ another kind of data store (e.g., an alternative type of database such as an object-oriented database or a hierarchical database, one or more unstructured "flat" files, etc.), and it will be clear to those skilled in the art, after reading this disclosure, how to make and use such alternative embodiments of data store 400.

As shown in FIG. 4, data store comprises table 401, feature location tables 402-1 through 402-N, where N is a positive integer, feature property tables 403-1 through 403-N, spline coefficient set 404, and feature constraint rule base 405.

Table 401 is a data structure for storing track geometry information, and in particular, data derived from piecewise polynomial spline 300, as described in detail below and with respect to FIG. 5.

Feature location tables 402-1 through 402-N are data structures for storing the locations of features along railroad track partition 100, as described in detail below and with respect to FIG. 6. In accordance with the illustrative embodiment, each feature location table 402-$i$, where i is an integer between 1 and N inclusive, corresponds to a respective feature class (e.g., mileposts, traffic signals, platforms, etc.), so that, for example, feature location table 402-1 might store the locations of all mileposts along railroad track partition 100, feature location table 402-2 might store the locations of all traffic signals along railroad track partition 100, and so forth. Moreover, in accordance with the illustrative embodiment feature location tables 402-1 through 402-N are organized into physical track locations.

Feature property tables 403-1 through 403-N are data structures for storing properties of features (e.g., enter and exit directions of a switch, a speed limit for a switch, etc.) as described in detail below and with respect to FIG. 6.

Spline coefficient set 404 stores the values of the coefficients of piecewise polynomial spline 300, as is well-known in the art.

Feature rule base 405 comprises one or more rules and/or constraints for the features along railroad track partition 100. In accordance with the illustrative embodiment, feature rule base 405 comprises one or more of the following:

- rules/constraints regarding the values of properties of the features (e.g., the speed limit of a switch must be a positive real number less than or equal to 100 miles per hour, etc.);
- rules/constraints regarding relationships between property values of a feature (e.g., the enter and exit directions of a switch must be at least 120 degrees apart and no more than 240 degrees apart, etc.);
- rules/constraints regarding relationships between property values of two or more features (e.g., the exit direction of a first switch must be within five degrees of the enter direction of a second switch, etc.);
- rules/constraints regarding the locations of features; and
- rules/constraints regarding relationships between locations of two or more features (e.g., the distance between a traffic signal and its associated switch must be at least X meters but at most Y meters, etc.).

As will be appreciated by those skilled in the art, some other embodiments of the present invention might organize the data stored in data store 400 in an alternative manner (e.g., the locations of all types of features might be stored in a single table, etc.), and it will be clear to those skilled in the art, after reading this disclosure, how to make and use such alternative embodiments. Moreover, it will be appreciated by those skilled in the art that in some other embodiments data store 400 might employ alternative types of data structures in lieu of tables (e.g., objects in an object-oriented database, trees in a hierarchical database, etc.), and it will be clear to those skilled in the art, after reading this disclosure, how to make and use such embodiments.

FIG. 5 depicts the structure of table 401 in accordance with the illustrative embodiment of the present invention. Each row in table 401 corresponds to a particular point of piecewise polynomial spline 300, which in turn corresponds to centerline geo-location 201-$i$ that is included in (e.g., 201-1, 201-39, etc.). As shown in FIG. 5, table 401 comprises columns 501 through 507.

Columns 501, 502, and 503 store x, y, and z coordinates, respectively, for each point of piecewise polynomial spline 300. As described below and with respect to FIG. 7, these coordinates are Earth-Centered Earth-Fixed Cartesian coordinates and are derived from the latitude, longitude, and altitude of the corresponding centerline geo-locations.

Columns 504, 505, and 506 store estimates of the heading, grade, and curvature of railroad track partition 100, respectively, at each point of piecewise polynomial spline 300. In accordance with the illustrative embodiment, column 504 stores the heading in degrees, column 505 stores the grade as a percentage, and column 506 represents track curvature in units of degrees/meter.

For the feature offsets, there is no corresponding track point element specifically located at that feature. The feature can lie between two track point elements. For feature offsets, however, one needs to have the corresponding track partition's track point elements (shown in FIG. 5) which do describe the geometry of that section of track.

FIG. 6 depicts the structure of tables 402-$i$ and 403-$i$, where i is an integer between 1 and N, in accordance with the illustrative embodiment of the present invention. Each row in table 402-$i$ corresponds to a feature of class i (e.g., mileposts, traffic signals, etc.) along railroad track partition 100. As shown in FIG. 6, table 402-*i* comprises columns 601-*i*, 602-*i*, and 603-*i*. Column 601-*i* stores an identifier that uniquely identifies each feature; column 602-*i* stores an indicium of a particular point of piecewise polynomial spline 300 (e.g., its row number in table 401, etc.), and 603-*i* stores an estimated distance offset from the point specified by column 602-*i*. In this way, the exact location of each feature can be derived from piecewise polynomial spline 300 and the corresponding entries of columns 602-*i* and 603-*i*.

For example, a row in table 402-*i* for feature 101-1 would specify an indicium of the point corresponding to centerline geo-location 201-8 (which is the point of spline 300 that immediately precedes feature 101-1, as shown in FIG. 3), and an estimated distance offset along railroad track partition 100 from this point (say, 205.3 centimeters). As will be appreciated by those skilled in the art, column 602-*i* is not required to determine the three-dimensional coordinates of a track-centric feature at a specific offset into the partition. The computations required to recover the geo-location of a feature from the information stored in tables 401 and 402-*i* are described in detail below and with respect to FIG. 8.

Each row in table 403-*i* corresponds to a feature of class i (e.g., mileposts, traffic signals, etc.) along railroad track partition 100. As shown in FIG. 6, table 403-*i* comprises columns 611-*i*, 612-*i*, and 613-*i*, each of which is for storing values of particular properties of the feature. (As will be appreciated by those skilled in the art, the fact that there are three such columns is merely illustrative, and some embodiments might have a smaller or larger number of such columns, or even a different number of such columns for each particular class i.) For example, if class i represents the class of switches, then column 611-*i* might store the enter direction of the switch, column 612-*i* might store the exit direction of the switch, and 613-*i* might store the maximum allowable speed limit for the switch.

Figure 7:
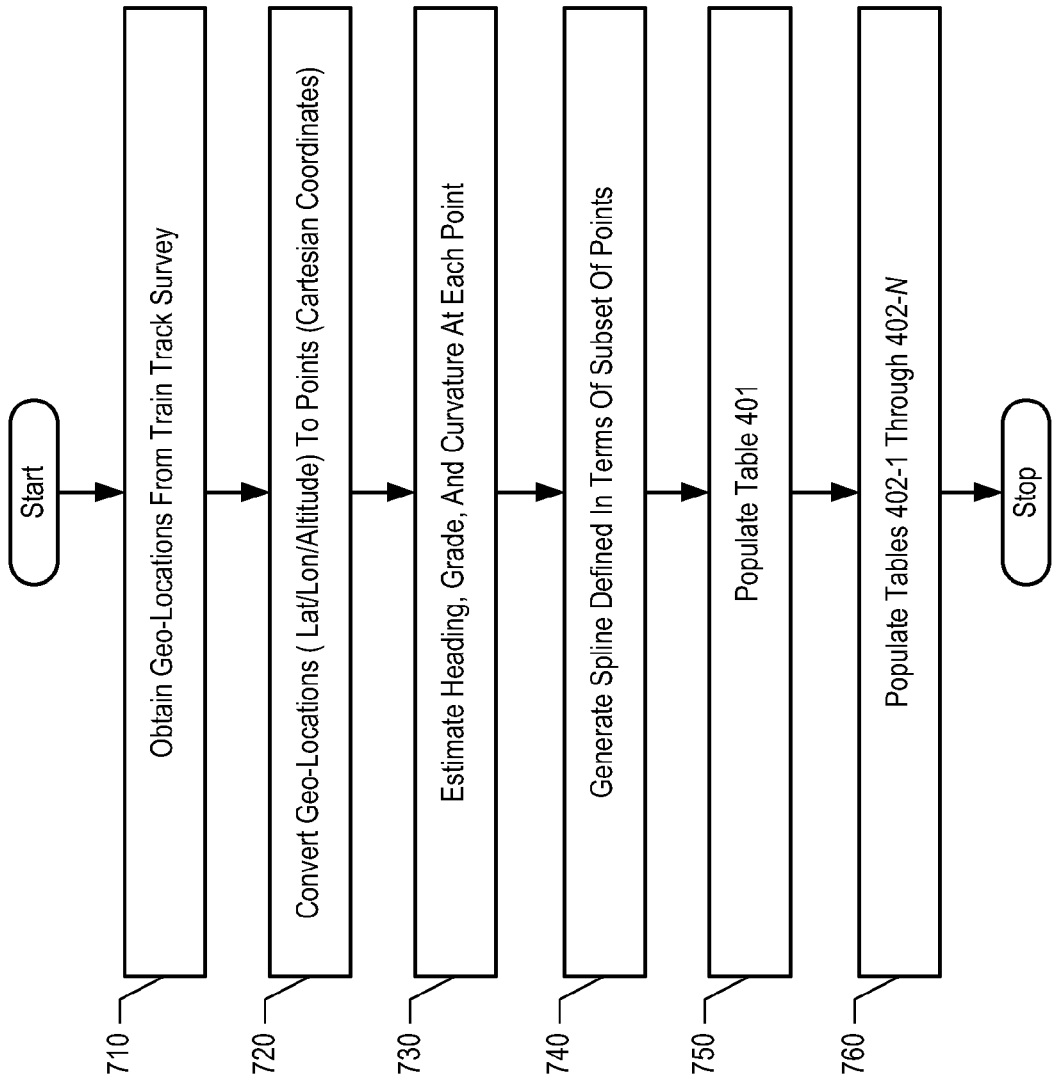
FIG. 7 depicts a flowchart of a method for populating tables 401 and 402-1 through 402-N, in accordance with the illustrative embodiment of the present invention.

FIG. 7 depicts a flowchart of a method for populating tables 401 and 402-1 through 402-N, in accordance with the illustrative embodiment of the present invention. It will be clear to those skilled in the art, after reading this disclosure, which tasks depicted in FIG. 7 can be performed simultaneously or in a different order than that depicted.

At task 710, track centerline geo-locations 201 and feature geo-locations 101 are obtained from a survey of railroad track partition 100.

At task 720, geo-locations 201 are converted from latitude/longitude/altitude to points expressed in Earth-Centered Earth-Fixed Cartesian coordinates, in well-known fashion.

At task 730, the heading, grade, and curvature of railroad track partition 100 are estimated at each of the points determined at task 720, in well-known fashion.

At task 740, piecewise polynomial spline 300 is generated, where the spline is defined in terms of a proper subset of the points determined at task 720.

At task 750, columns 501 through 506 of table 401 are populated with the coordinates and heading/grade/curvature estimates for each of the subset of points determined at task 740. In addition, column 507 is populated with a distance offset from the first point in the table (i.e., the point corresponding to geo-location 201-1), so that the entries in column 507 are monotonically increasing, starting with zero in the first row. The distance offset is particularly useful in determining the locations, extents, magnitude, and nature of horizontal and vertical railroad track curves.

At task 760, tables 402-1 through 402-N are populated with data corresponding to features 101 of railroad track partition 100, where, as described above, each feature corresponds to a row in one of these tables, and the corresponding row comprises: a feature identifier, an indicium of the point on piecewise polynomial spline 300 that immediately precedes the feature, and an estimated distance offset from this point. As will be appreciated by those skilled in the art, the distance offset can be estimated via elementary Calculus from the coordinates of the feature, the coordinates of the preceding point, and the equation of piecewise polynomial spline 300. As mentioned above, the geo-locations of features 101 can be recovered from these data via the method described below and with respect to FIG. 8.

Figure 8:
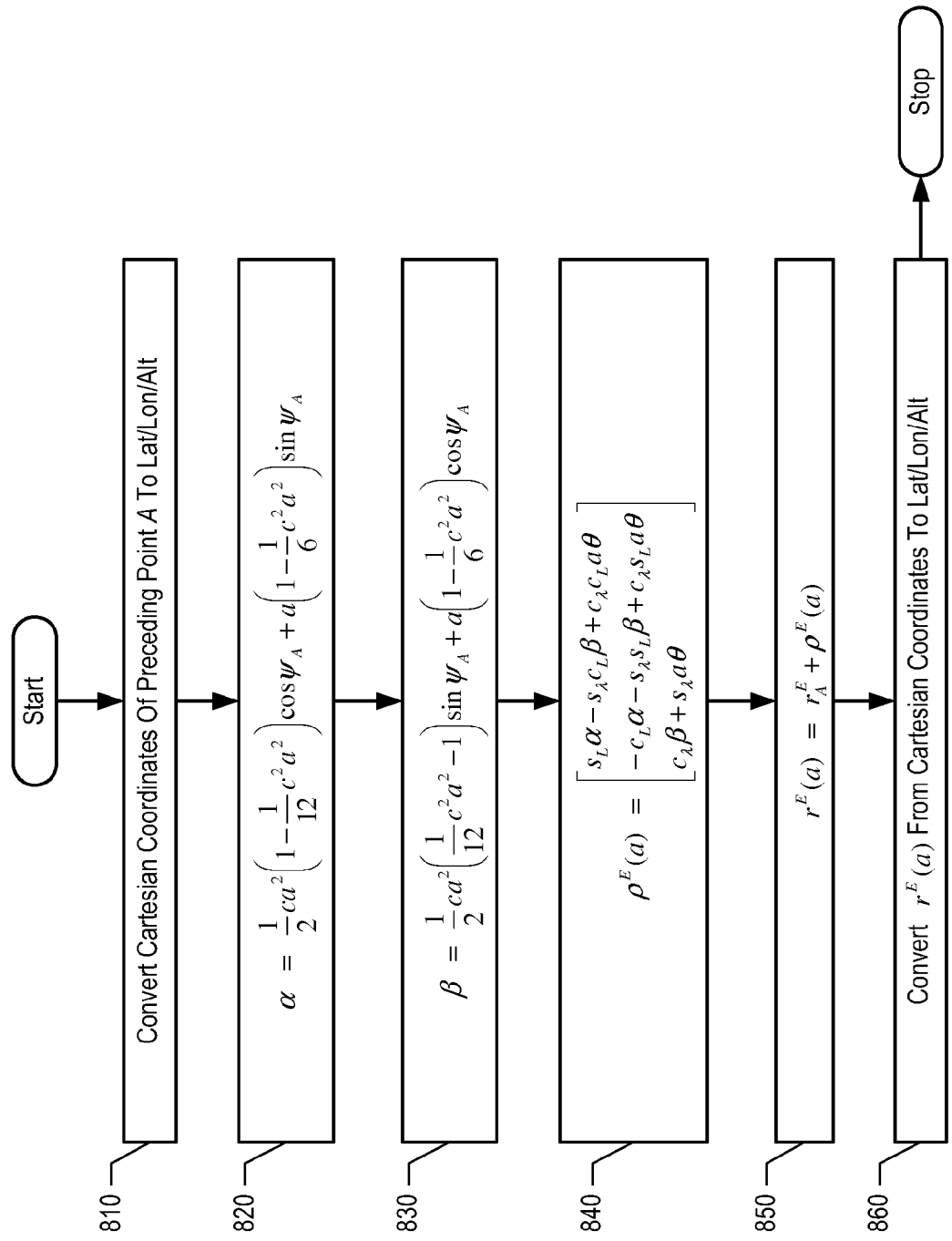
FIG. 8 depicts a flowchart of a method for determining the geo-location of a feature based on the contents of data store 400, in accordance with the illustrative embodiment of the present invention.

FIG. 8 depicts a flowchart of a method for determining the geo-location of a feature based on the contents of data store 400, in accordance with the illustrative embodiment of the present invention. It will be clear to those skilled in the art, after reading this disclosure, which tasks depicted in FIG. 8 can be performed simultaneously or in a different order than that depicted.

At task 810, the Cartesian coordinates of preceding point A on piecewise polynomial spline 300 (i.e., A is the point on spline 300 that immediately precedes the feature) is converted to latitude/longitude/altitude, in well-known fashion.

At task 820, coefficient α is computed using Equation 1:

$$\alpha = \frac{1}{2}ca^2\left(1 - \frac{1}{12}c^2a^2\right)\cos\psi_A + a\left(1 - \frac{1}{6}c^2a^2\right)\sin\psi_A \quad \text{(Eq. 1)}$$

where a is an offset from point A, c is curvature, and $\psi_A$ is the heading at point A.

At task 830, coefficient β is computed using Equation 2:

$$\beta = \frac{1}{2}ca^2\left(\frac{1}{12}c^2a^2 - 1\right)\sin\psi_A + a\left(1 - \frac{1}{6}c^2a^2\right)\cos\psi_A \quad \text{(Eq. 2)}$$

At task 840, vector $\underline{\rho}^E(a)$ is computed using Equation 3:

$$\underline{\rho}^E(a) = \begin{bmatrix} s_L\alpha - s_\lambda c_L\beta + c_\lambda c_L a\theta \\ -c_L\alpha - s_\lambda s_L\beta + c_\lambda s_L a\theta \\ c_\lambda\beta + s_\lambda a\theta \end{bmatrix} \quad \text{(Eq. 3)}$$

where θ is grade, $s_L$ is shorthand for sine(longitude), $s_\lambda$ is shorthand for sine(latitude), $c_L$ is shorthand for cosine(longitude), $c_\lambda$ is shorthand for cosine(latitude), and latitude is geodetic. Vector $\underline{\rho}^E(a)$ is the Earth-Centered Earth-Fixed displacement vector to get to the centerline point at distance a beyond point A.

At task 850, Cartesian coordinate vector $\underline{r}^E(a)$ is computed using Equation 4:

$$\underline{r}^E(a) = \underline{r}_A^E + \underline{\rho}^E(a) \quad \text{(Eq. 4)}$$

where $\underline{r}_A^E$ is the vector of Earth-Centered Earth-Fixed coordinates stored at point A.

At task 860, vector $\underline{r}^E(a)$ is converted from Cartesian coordinates to latitude/longitude/altitude, in well-known fashion. After task 860, the method of FIG. 8 terminates.

Validation of the Database

Once data store 400 has been constructed, the data in data store 400 is validated. In particular, in accordance with the illustrative embodiment of the present invention, the data is validated in two ways: (1) by checking the data for consistency against a geological database, and (2) by checking the data for internal consistency.

In the first case, the geo-locations of features in data store 400 are checked for consistency with the geo-locations of monuments in the geological database, as described below and with respect to FIGS. 9 and 10. In the second case, the locations and property values of features are checked for conformance with feature rule base 405. As will be appreciated by those skilled in the art, there are a variety of ways known in the art by which the contents of tables 402-1 through 402-N and tables 403-1 through 403-N, as well as the contents of table 401 and spline coefficient set 404, can be checked for conformance with the rules/constraints of feature rule base 405 (e.g., via a rule-based expert system shell, via a constraint satisfaction engine, etc.).

Figure 9:
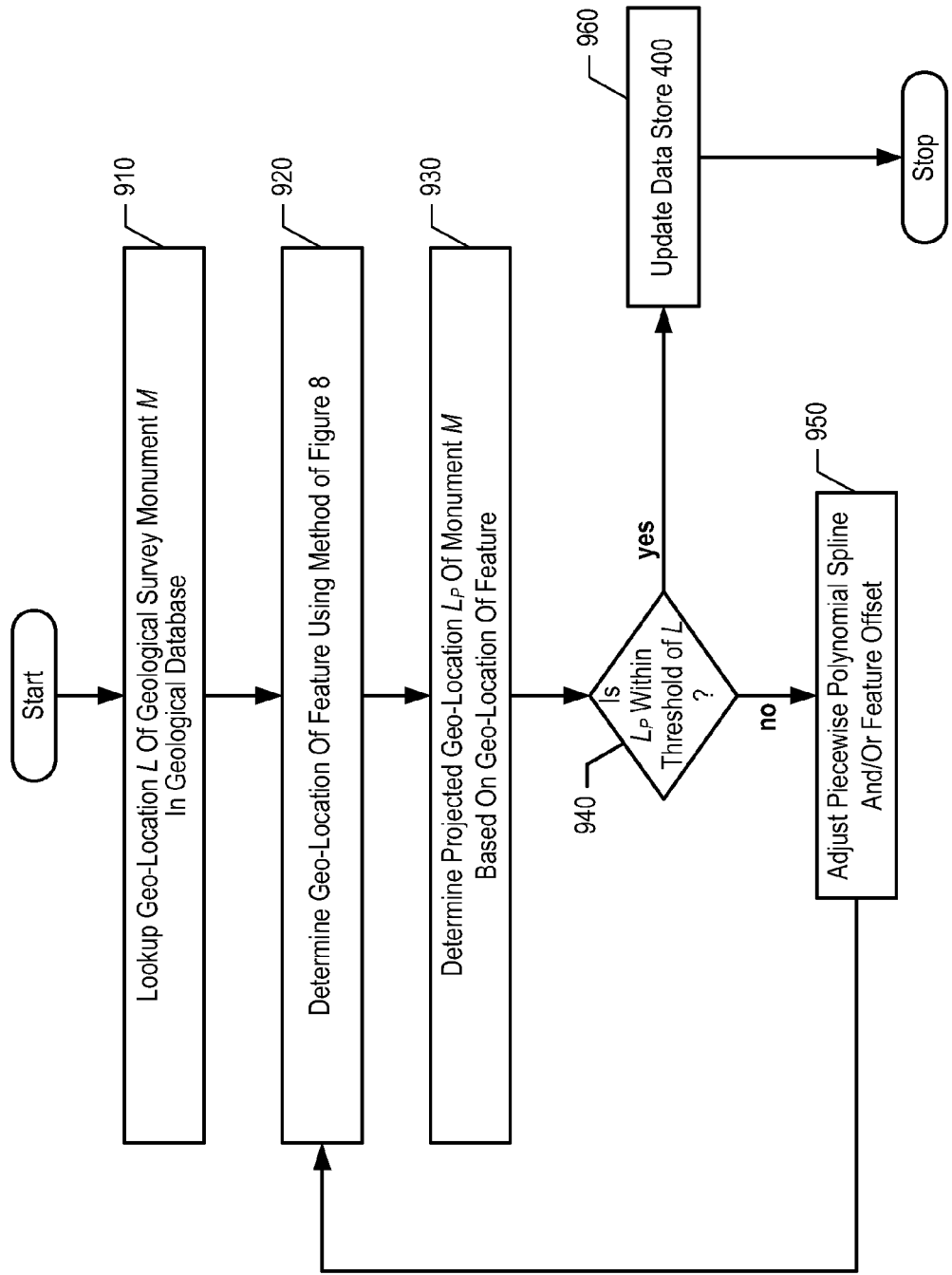
FIG. 9 depicts a flowchart of a first method for validating data store 400 against a geological database, in accordance with the illustrative embodiment of the present invention.

FIG. 9 depicts a flowchart of a first method for validating data store 400 against a geological database, in accordance with the illustrative embodiment of the present invention. In the illustrative embodiment, a United States Geological Survey (USGS) database comprising the locations of survey monuments is employed as the geological database. As will be appreciated by those skilled in the art, some other embodiments of the present invention might employ a different geological database, and it will be clear to those skilled in the art, after reading this disclosure, how to validate data store 400 with such an alternative geological database.

At task 910, the geo-location L of a geological survey monument M in the geological database is looked up, in well-known fashion.

At task 920, the geo-location of a feature in data store 400 is determined using the method of FIG. 8.

At task 930, the projected geo-location $L_p$ of monument M is estimated based on the geo-location of the feature. As will be appreciated by those skilled in the art, projected geo-location $L_p$ might be estimated in a variety of ways (e.g., using a known heading and distance from the feature to monument M, etc.).

Task 940 checks whether projected geo-location $L_p$ is within a distance threshold of geo-location L. If not, execution proceeds to task 950, otherwise, execution continues at task 960.

At task 950, either one or both of piecewise polynomial spline 300 and the offset for the feature is adjusted in order to reduce the discrepancy between the actual geo-location of monument M and the projected geo-location of monument M based on the feature geo-location. As will be appreciated by those skilled in the art, adjustment of piecewise polynomial spline 300 might involve changes to track points, changes to one or more spline coefficients, or both. After task 950, the method of FIG. 9 continues back at task 920.

At task 960, data store 400 is updated accordingly based on the updated geometric data. After task 960, the method of FIG. 9 terminates.

As will be appreciated by those skilled in the art, the method of FIG. 9 can be performed for as many feature/monument pairs as desired.

Figure 10:
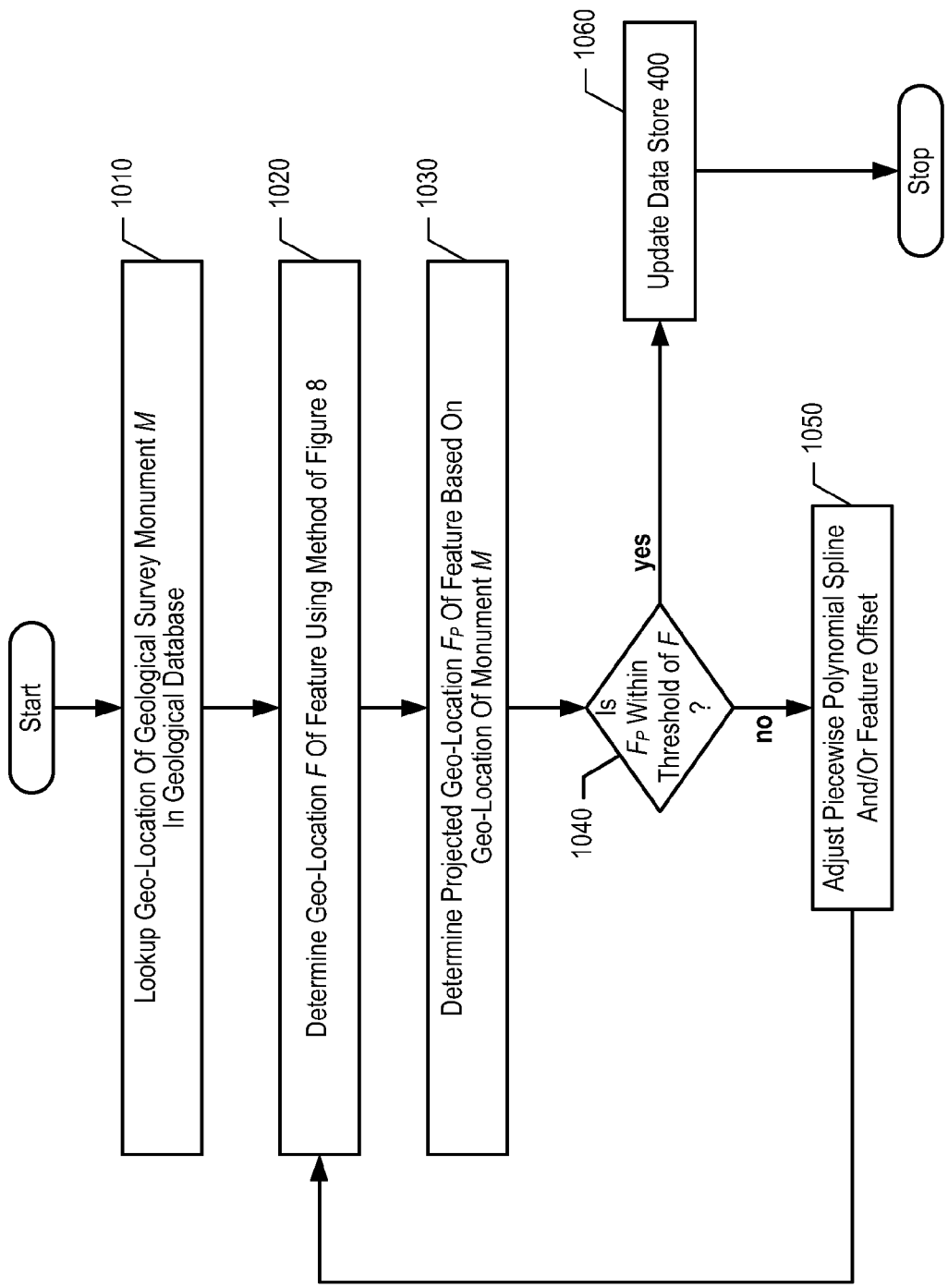
FIG. 10 depicts a flowchart of a second method for validating data store 400 against a geological database, in accordance with the illustrative embodiment of the present invention.

FIG. 10 depicts a flowchart of a second method for validating data store 400 against a geological database, in accordance with the illustrative embodiment of the present invention.

At task 1010, the geo-location of a geological survey monument M in the geological database is looked up, in well-known fashion.

At task 1020, the geo-location F of a feature in data store 400 is determined using the method of FIG. 8.

At task 1030, the projected geo-location $F_p$ of monument M is estimated based on the geo-location of monument M. As will be appreciated by those skilled in the art, projected geo-location $F_p$ might be estimated in a variety of ways (e.g., using a known heading and distance from monument M to the feature, etc.).

Task 1040 checks whether projected geo-location $F_p$ is within a distance threshold of geo-location F. If not, execution proceeds to task 1050, otherwise, execution continues at task 1060.

At task 1050, either one or both of piecewise polynomial spline 300 and the offset for the feature is adjusted in order to reduce the discrepancy between geo-location F and projected geo-location $F_p$. As will be appreciated by those skilled in the art, adjustment of piecewise polynomial spline 300 might involve changes to track points, changes to one or more spline coefficients, or both. After task 1050, the method of FIG. 10 continues back at task 1020.

At task 1060, data store 400 is updated accordingly based on the updated geometric data. After task 1060, the method of FIG. 10 terminates.

As will be appreciated by those skilled in the art, the methods of FIGS. 9 and 10 can be performed by a data-processing system (e.g., desktop computer, server, etc.) that comprises a memory (e.g., random-access memory, flash memory, a hard-disk, etc.) for storing the contents of data store 400 and a processor (e.g., a general-purpose microprocessor, a specialized processor, etc.). As will further be appreciated by those skilled in the art, checking the contents of data store 400 for conformance with the rules/constraints of feature rule base 405 can also be performed in well-known fashion by such a data-processing system.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A data processing method of validating by a processor and correcting a track database based on the contents of a geological database, the method comprising:

computing, by a data-processing system that is associated with said track database, a geo-location of a feature along a train track based on a geometric representation of said train track and an offset from a point on said train track to said feature, wherein said track database comprises said geometric representation and said offset;

estimating, by said data-processing system, a first geo-location of a monument based on the geo-location of said feature; and when said estimated first geo-location of said monument differs by at least a threshold distance from a second geo-location of said monument in said geological database, adjusting, by said data-processing system, at least one of said geometric representation and said offset in said track database so that a re-computed estimate of said first geo-location of said monument is within said threshold distance, thereby correcting said track database based on said second geo-location of said monument in said geological database.

2. The method of claim 1 wherein said geometric representation is obtained from a survey of said train track.

3. The method of claim 1 wherein said geometric representation is a piecewise polynomial spline.

4. The method of claim 1 wherein said geological database is a governmental survey database.

5. The method of claim 1 wherein the estimated first geo-location of said monument is based on a heading and a distance from said feature.

6. The method of claim 1 wherein said feature is a switch.

7. The method of claim 1 wherein said feature is a station.

8. The method of claim 1 wherein said feature is a traffic signal.

9. A data processing method of validating by a processor and correcting a track database based on the contents of a geological database, the method comprising:
   computing, by a data-processing system that is associated with said track database, a first geo-location of a feature along a train track based on a geometric representation of said train track and an offset from a point on said train track to said feature, wherein said track database comprises said geometric representation and said offset; and
   when said first geo-location of said feature differs by at least a threshold distance from a projected geo-location that is derived from said geological database, adjusting, by said data-processing system, one or both of said geometric representation and said offset in said track database so that a re-computed first geo-location of said feature is within said threshold distance of said projected geo-location, thereby correcting said track database based on said geological database.

10. The method of claim 9 wherein said geometric representation is obtained from a survey of said train track.

11. The method of claim 9 wherein said geometric representation is a piecewise polynomial spline.

12. The method of claim 9 wherein said geological database is a governmental survey database.

13. The method of claim 9 wherein the projected geo-location is based on a heading and a distance from a monument in said geological database.

14. The method of claim 9 wherein said feature is a traffic signal.

15. The method of claim 9 wherein said feature is a switch.

16. The method of claim 9 wherein said feature is a milepost.

* * * * *